(No Model.)
H. HANSTEIN.
SCHOOL BLACKBOARD.
No. 278,010. Patented May 22, 1883.
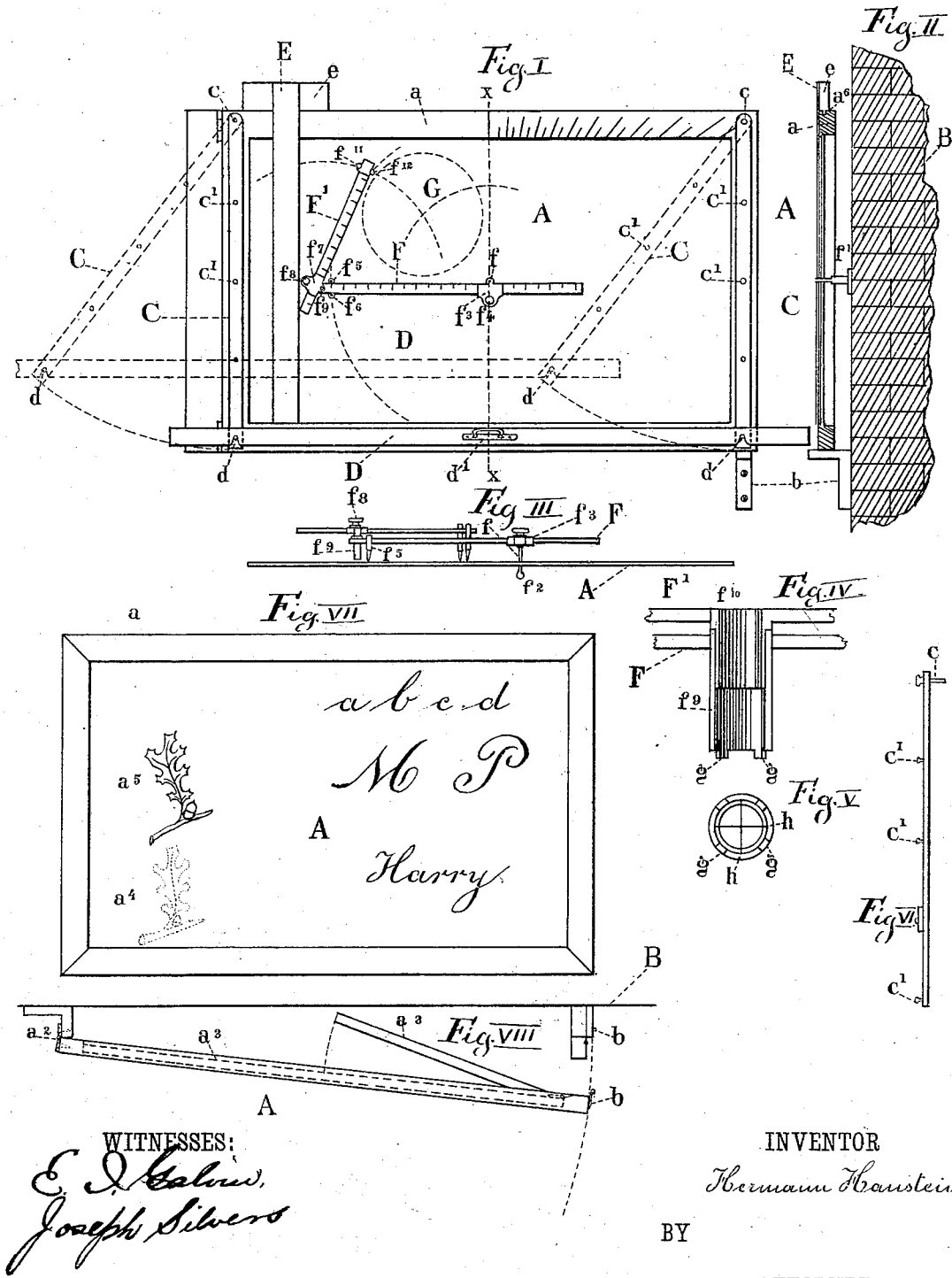
WITNESSES:
INVENTOR
Hermann Hanstein
BY
ATTORNEY

UNITED STATES PATENT OFFICE.

HERMANN HANSTEIN, OF CHICAGO, ILLINOIS.

SCHOOL-BLACKBOARD.

SPECIFICATION forming part of Letters Patent No. 278,010, dated May 22, 1883.

Application filed April 27, 1882. (No model.)

*To all whom it may concern:*

Be it known that I, HERMANN HANSTEIN, of the city of Chicago, county of Cook, and State of Illinois, have invented a new and useful Improvement in Wall-Boards and Slates for School and other Purposes, of which the following is a description, reference being had to the accompanying drawings, forming a part of this specification, in which—

Figure I is an elevation of my improved wall-board with its accompanying mechanical appliances connected therewith. Fig. II is a transverse sectional view through the line *x x*, Fig. I. Fig. III is a side view of my improved ruler and compass, showing the manner of applying the same to said wall-board. Fig. IV is an enlarged detailed sectional view, showing the hollow tubular pivot applied in adjusting one part of the ruler to the other. Fig. V is a bottom view of the same, showing the manner of obtaining and fixing a given point as a center from which to draw a circle. Fig. VI is a side view of the upright frame, showing the swinging bars or slats attached thereto for the support of a ruler. Fig. VII is an elevation of my improved wall-board as applied to free-hand drawing, and Fig. VIII is a top view of the same.

Like letters of reference indicate like parts in the different figures.

Great difficulty has heretofore been experienced in the use of slates and blackboards in teaching perspective and in indicating the various degrees of light and shade in a manner sufficiently simple to be readily comprehended by the pupil, and likewise in teaching industrial drawing much confusion is felt by the pupil in distinguishing the "construction-lines" from the others where both are of the same color. It is essential that the learner should understand that "projection" is indicated by light and shade, and in order to do this he should be shown all the gradations from white to black. Outline exercises only are practicable upon the ordinary blackboard or slate, the single color of white being alone clearly shown upon its surface, while black is invisible. Both, however, should be shown with equal clearness in order to accomplish the best results either in industrial or free-hand drawing, while, for the reasons hereinafter shown, the writing-surface should not be opaque but semi-transparent.

As the majority of teachers in schools who are called upon to teach drawing of various kinds are not skilled artists, and hence are incompetent without the assistance of other means to convey knowledge the illustration of which they do not possess the practical skill to impart, my object is to provide means whereby penmanship, free-hand and industrial drawing, and especially the latter, as well as perspective, may not only be clearly illustrated, but by unskilled teachers. In order to do this, I provide a transparent or semi-transparent writing-surface, preferably made of ground or etched glass, behind which outline-charts, maps, or drawings may be placed, said writing-surface having a neutral tint, upon which white or black or colored crayon, charcoal, or other like material may be used for drawing with such effect that the lines of each may show with equal or proportionate distinction and clearness, thus enabling the laws of perspective—of light and shade—to be the more readily explained to and comprehended by the pupil, while in the teaching of industrial drawing the construction-lines, by their different color, are, in the minds of the pupils, at all times separated from the others. Much confusion is thereby avoided, and the teacher of moderate experience is thus enabled to exhibit all the proficiency of an accomplished artist.

A further object is to provide such mechanical appliances in connection with said drawing or writing surface, as that geometrical and industrial drawings may be produced and illustrated with accuracy and ease by teachers possessed of but moderate skill in or knowledge of those arts. My manner of accomplishing these objects is hereinafter more fully described, and definitely pointed out in the claims.

In the drawings, A represents a writing or drawing surface, preferably made of a plate of tinted ground glass inclosed in a frame, *a*, of wood or other suitable material, which, in the preferable construction, is made to project but slightly above the surface of the glass. The surface of the glass may be prepared by grinding, etching with sulphate of fluor-spar, or in a sand-blast; but the latter process is liable to give too smooth a surface for the use of chalk or crayon. It is essential, in order to give the desired results, that the marking-surface should have a neutral tint. This is preferably obtained or imparted by staining or coloring the glass itself; but may also be imparted by using colored charts or placing colored paper, cloth, or any other suitable material capable of giving the desired tint, but which may be removed at will, behind the glass, in which case the glass itself need not be colored. Any color may be used—as red, green, brown, &c.—it being only necessary to use a low tone upon which white and black lines may be shown with equal distinctness. It it obvious that, given a marking-surface of an intermediate shade between white and black, marks of those colors will show with equal clearness. The board or plate A may then, with or without the frame $a$, be used for writing or drawing purposes, and for teaching penmanship, geometry, plotting, or any art wherein graphic illustration, and particularly the use of light and shade is required, or projection is to be indicated or construction and "free" lines distinguished.

In using my improved wall-board, I prefer to have it hinged to the wall in any convenient way, in order that it may be swung outward therefrom to permit the placing behind it of maps, charts, diagrams, &c., in accordance with the subject requiring illustration. The most convenient adjustment would be to swing it horizontally from either side; but it may likewise be swung outward from the top or bottom or removed from the wall entirely.

In Fig. VIII, B represents the wall, with the board A swung outward therefrom upon the hinges $a^2$. On the back of the plate A, I preferably place a door or doors, $a^3$, suitably hinged to the frame $a$, and adjusted so that they may serve as a backing to the plate A, with their inner surfaces fitting against it, or approximately so, in order that a paper chart or diagram may be placed between the glass A and the doors $a^3$, and held smoothly against the former by the latter. The doors $a^3$ may then be closed and secured by any suitable hook or catch, and the frame $a$ swung back to the wall and fastened by the hook $b$, or by any well-known means. A support, $b'$, may be used to prevent sagging of the board when closed.

In order to illustrate the various subjects of free-hand drawing, plotting, penmanship, &c., I place a paper chart, with the required letters or figures printed in outline thereon, behind the plate A, as described. The outlines show through the glass with sufficient distinctness to be seen by the teacher, though not by the pupils. If penmanship is to be taught, the characters illustrating any desired system are printed on various charts, from one of which, when inserted, the teacher traces the letters or words in crayon, as indicated on one part of the plate A in Fig. VIII. A system of charts illustrating the various stages of free-hand drawing may be used. At the left hand of the plate A, Fig. VII, $a^4$ illustrates the outline of a leaf, as shown through the glass, while $a^5$ shows a leaf as developed in crayon by the teacher from a similar outline beneath.

By the addition of certain mechanical devices, which may be readily attached to the board A, or detached therefrom, I am enabled to teach plain and descriptive geometry, surveying, mechanical, architectural, and other drawing wherein the use of instruments is required, with an accuracy and ease heretofore unknown and unattempted upon a wall-board.

Upon the ends of the frame $a$, I attach slats or bars C C, Fig. I, which are loosely pivoted at their upper ends to the frame $a$ by the pins $c\,c$. At corresponding distances from each other in each slat C, I insert pins $c'$. (More clearly shown in Fig. VI.) A bar or straight-edge, D, preferably provided with notches $d$ on its lower side, is then placed horizontally across the plate A upon the pins $c'$, the latter being inserted within the notches $d$, which adjustment serves to maintain the bars C parallel to each other. A suitable handle, $d'$, is then secured to the straight-edge, by which it may be swung upon the bars C, as indicated by the dotted lines, and adjusted to any height. Any number of pins $c'$ may be used, as found most convenient, it being only necessary to lift the bar D from one to the other to correspond to the part of the board upon which the operator needs to use it. It is thus obvious that the straight-edge D must always maintain a horizontal position, and may be capable of the finest adjustments, in which respect it is superior to a graduated scale upon the frame of the slate or board, in that it works automatically, with greater speed, and with the utmost accuracy. For drawing vertical lines, I place a T-square, E, perpendicularly across the plate A, the head $e$ being made to slide horizontally upon the top of the frame $a$, the latter being grooved, as shown at $a^6$, Fig. II, to receive a corresponding tongue upon the lower side of the head $e$, or vice versa. Grooved rollers or any other suitable device may be adopted to permit the sliding movement of the square E and prevent its falling off the frame $a$.

With the ruler D and E it is obvious that horizontal and vertical lines may be drawn upon any part of the board A. For oblique lines and circles I use the following-described appliances: At the center of the board A, I drill a small hole, $f$, Fig. I, through the plate, opposite to which, in the rear of the plate, I attach rigidly to the wall a stud, $f'$, Fig. II, consisting, preferably, of a split tube, the outer end of which may extend nearly to the glass A. Into this tube I insert a pin, $f^2$, Fig. III, the end of which is sufficiently enlarged, that, when pushed into the hollow stud $f'$, which is provided with a corresponding enlargement, the former may be held loosely therein and allowed to turn, but may also be readily withdrawn, when required, by the application of slight force. The pin $f^2$, forming a pivot, is rigidly attached to a metal sleeve, $f^3$, into which is inserted a ruler, F, having upon its outer surface a graduated scale, by which its length from the pivotal point $f$ may be adjusted, after which the ruler F may be secured in the sleeve $f^3$ by the set-screw $f^4$. At or near the end of the ruler F are rigidly fixed two split tubes, $f^5 f^6$, into which, respectively, may be fixed pieces of white and black crayon. It is obvious that by turning the ruler F upon the pivotal point $f$ a circle of any desired size may be struck from said point, using either the white or black crayon. A second and like metallic sleeve, $f^7$, is pivoted upon the end of the ruler F, near where the crayons $f^5 f^6$ are attached. Into the sleeve $f^7$ a similar graduated ruler, F′, is inserted, and secured in like manner by a set-screw, $f^8$. Upon the outer end of the ruler F′ a similar device, $f^{11} f^{12}$, to that on ruler F may be attached for the reception of black and white crayon. It is evident that as the pivotal point $f^9$ may be varied to any extent by swinging the ruler F, as well as by changing the length by the sleeve-adjustment $f^3$, a circle of any required size may be struck from $f^9$, as a center, upon any part of the board A, and in any desired relation to a circle of which $f$ is the center. The dotted arcs indicate the circles which may be struck by the rulers F and F′, as the same are shown to be adjusted in the drawings. That the centers of circles to be struck by the ruler F′ may be the more accurately located, I provide for the pivotal point $f^9$ a hollow tube, which is more clearly shown in Figs. IV and V, the former being a transverse sectional view and the latter a bottom view. Into the tube $f^9$ a second tube, $f^{10}$, is inserted and intended to turn therein. Upon the bottom of the tube $f^9$, I provide studs or projections $g$, between which the light is admitted upon the board, the studs being preferably tipped with rubber, that the tube $f^9$ may not slip or make any noise upon the surface of the board when in use. An inferior construction would be to point the bottom of the tube $f^9$ and tip the same with hard rubber or other like substance. Across the bottom of the tube $f^9$ and intersecting at its center I stretch two fine wires or threads, $h\,h$, which are intended to assist in accurately locating the pivotal point $f^9$ over any desired center. For example, assuming that a circle is to be struck from the intersection of the arcs indicated by the letter G, Fig. I, the tube $f^9$ is placed over the point G, with the point of intersection of the wires $h\,h$ immediately over the intersectional points of the arcs. A gentle pressure with one hand is then made thereover to hold the pivotal tube $f^9$ in position when the circle shown, of which G is the center, is struck with the other hand. In order that the circle formed by the ruler F′ may be complete, it is necessary to bend the crayon-holder at the end, so as to pass under the ruler F to the extent of the width of the latter; or the circle may be formed until the crayon strikes the ruler F, when the remainder may be completed in free-hand. The rulers F and F′ should be so adjusted with reference to the pivotal points that one side—preferably the top of the ruler—may be used to draw the diameter or radius of any circle of which that ruler forms the radius.

The frame $a$ may be used as a protractor, as shown in Fig. I, and any required angle obtained therefrom by the use of the ruler F. In place of the rulers F and F′, any suitable instrument may be attached to the board, whereby ovals and ellipses may be drawn. The principle of the volute may be illustrated by unwinding a string from a spool fixed at the point $f$, the line of enlargement being indicated by a crayon attached to the end of the cord.

In geometrical constructions the construction-lines may be made in one color and the free lines in another, so that the pupil may be the more readily enabled to trace the development of each figure or construction.

Printed charts in outline, showing the construction and real lines in white and black, may be used by the teacher, if desired; or he may refer to text-books.

It is apparent that by the use of my improved wall-board any figure or diagram required in illustrating plane or descriptive geometry or industrial drawing may be formed, and from the foregoing it will be seen that any art the characters or figures of which are capable of being traced or otherwise formed may be taught accurately and systematically by a teacher of comparatively little skill. The pupil, instead of seeing a multiplicity of objects which serve, by their number, only to confuse, sees but the one to which his attention is immediately directed, and which is developed and delineated step by step and its various principles explained in his presence. A constant and unvarying interest is thereby maintained, which cannot be kept up when the pupil is permitted to work from drawings, charts, or text-books, all of which are kept constantly before him from day to day until their entire novelty has departed.

Common slates may be used with the same mechanical appliances, as described; or the writing-surface, instead of slate, may be of tinted ground glass, in which case it is preferable to make them double, so that paper may be inserted between the plates with the desired figures, letters, or lines printed on said paper. The formation of straight lines by the usual mode of grooving or painting the slates may thus be obviated, and the pupil provided with a smooth, even surface upon which to write.

Any semi-transparent material possessing in any degree the requisite qualities—such as oiled paper treated with soluble silica—might be used instead of ground glass; but such, or its equivalent, would only be an inferior modification of my invention and method.

Having thus described my invention, I claim as new—

1. A wall-board or slate consisting, essentially, of a plate of ground or etched glass having a neutral tint imparted to it, in the manner and for the uses and purposes substantially as described.

2. A semi-transparent wall-board or slate, consisting, essentially, of a plate of ground or etched glass having a neutral tint imparted to it by a colored background, for the uses and purposes substantially as described.

3. A semi-transparent wall-board or slate having a neutral tint imparted thereto, and provided with suitable models or charts, the figures and outlines of which may be dimly seen through the board and traced and reproduced thereon in black and white colors, for the uses and purposes substantially as described.

4. A wall-board or slate consisting, essentially, of a plate of ground or etched glass having a neutral tint imparted thereto, and provided with a hinged or removable frame, suitable outline charts or diagrams, and a hinged or removable back, substantially as and for the uses and purposes set forth.

5. A wall-board provided with perpendicular bars pivoted at their top to the frame or board, into which said bars pins may be inserted for the support and manipulation of a horizontal ruler, and provided also with a T-square secured loosely to the top of the frame and a double-jointed pivoted ruler, the first part of which is pivoted to the center of the board and the other to the first ruler, substantially in the manner and for the uses and purposes set forth.

6. A wall-board or slate provided with a jointed or swiveled ruler pivoted at the center of said board, and having a hollow tubular pivot by which one part of the ruler is jointed or pivoted to the other, for the uses and purposes substantially as described.

7. A wall-board or slate provided with a jointed or swiveled ruler having a hollow tubular pivot by which one part of the ruler is jointed or pivoted to the other, and provided with fine wires or cords intersecting at its center, and projecting rubber-tipped studs at its base, substantially as described.

8. A semi-transparent wall-board or slate having a neutral tint imparted thereto, provided with removable mechanical instruments applicable to the teaching of industrial drawing, with means for distinguishing construction and other lines by different colors, and which board or slate may be applied alternately to the illustration of mechanical and free-hand drawing, substantially as described.

9. A semi-transparent wall-board or slate having a neutral tint imparted thereto, provided with removable mechanical instruments applicable to the teaching of industrial drawing, suitable charts for the illustration of mechanical or free-hand drawing, and which may be applied alternately to one or the other purpose, substantially as described.

10. A wall-board or slate provided with a swinging detachable ruler pivoted at the center thereof, substantially as described.

11. A wall-board or slate provided with a hole at its center and means for pivoting a ruler thereto, substantially as described.

12. A wall-board or slate provided with a swinging ruler pivoted at the center of said board, said ruler being so adjusted that one of its edges may be substantially in line with the center of circles struck thereby, so that the diameter of said circles may be drawn from said edge, substantially as described.

HERMANN HANSTEIN.

Witnesses:
E. I. GALVIN,
JOSEPH SILVERS.